Patented Apr. 21, 1925.

1,534,199

UNITED STATES PATENT OFFICE.

JOHN WILSON, OF CROOK, ENGLAND, ASSIGNOR TO JOHN WILSON AND PEASE AND PARTNERS LIMITED, BOTH OF DARLINGTON, DURHAM, ENGLAND.

MANUFACTURE OF SILICA BRICKS.

No Drawing. Application filed September 29, 1922. Serial No. 591,428.

*To all whom it may concern:*

Be it known that I, JOHN WILSON, a subject of the King of Great Britain and Ireland, residing at Crook, in the county of Durham, England, have invented Improvements in or Relating to the Manufacture of Silica Bricks, of which the following is a specification.

This invention has reference to the manufacture of silica bricks, that is to say, refractory bricks in which the percentage of silica is very high, say of the order of about 96%, and it has for its object to provide bricks of this character that shall not be liable to expand to any appreciable or injurious degree when subjected to high temperatures, which is very important when the bricks are to be used in the construction of coke ovens, metallurgical furnaces and like plant where high temperatures obtain.

For this purpose in the manufacture of silica bricks according to the invention, there are used in conjunction with natural siliceous material, such as ganister stone or Dinas stone, or a mixture thereof, in a powdered condition and consisting mainly of silica, and hereinafter referred to generically as siliceous stone, a relatively small proportion of china clay and lime. The proportions of siliceous stone, china clay and lime to be employed can be varied to some extent. Satisfactory results have been obtained by using a mixture comprising about 96% of ganister stone or Dinas stone, and also a mixture thereof, 2.5% of china clay and 1.5% of lime. The china clay and lime, each mixed with water so as to form therewith an aqueous mixture, as obtained say from separate mechanical mixers or tanks, are added to the siliceous stone in a dry and powdered condition and the whole thoroughly mixed together. In other respects, refractory bricks of the kind referred to, may be made in the usual manner, from a mixture of ingredients such as above described. Thus, for instance, the mixed materials, in the form of a plastic mass, may be passed into a pug mill from which the plastic mass is forced on to a table and formed into bricks by wire cutting in the ordinary way, or the plastic mass of mixed material may be formed into bricks by moulding. In either case, the bricks are afterwards dried and burnt.

What I claim is:—

1. The herein described method of manufacturing highly refractory bricks, which consists in intimately mixing finely divided china clay and lime with finely divided natural siliceous stone, the percentage of the siliceous stone being of the order of 96% and of china clay and lime together about 4%, and forming the mixture into bricks.

2. The herein described method of manufacturing highly refractory bricks, which consists in intimately mixing china clay and lime each in a finely divided condition with natural siliceous stone also in a finely divided condition, the percentage of china clay being of the order of about 2.5% and that of the lime about 1.5%, and forming the mixture into bricks.

3. The herein described method of manufacturing highly refractory bricks which consists in intimately mixing about 4% of china clay and lime taken together and each in admixture with water, with about 96% of natural siliceous stone in a dry subdivided condition, and forming the resulting mass into bricks.

4. The herein described method of manufacturing highly refractory bricks, which consists in intimately mixing with about 96% of ground Dinas stone, about 4% of china clay and lime taken together and in admixture with water and forming the mixture into bricks.

5. The herein described method of manufacturing highly refractory bricks which consists in adding to a dry powdered mixture of about 96% of Dinas stone and ganister stone, about 4% of china clay and lime taken together and in a finely divided condition and in admixture with water, intimately mixing the said ingredients and forming the resulting plastic mass into bricks.

6. As a new article of manufacture, a highly refractory brick comprising natural siliceous stone, china clay and lime, the proportion of the natural siliceous stone being of the order of about 96% and that of the china clay and lime together being of the order of about 4%.

7. As a new article of manufacture, a highly refractory brick comprising about 96% of natural siliceous stone, about 2.5% of china clay and about 1.5% of lime.

8. As a new article of manufacture, a highly refractory brick comprising about 96% of Dinas brick, about 2.5% of china clay and about 1.5% of lime.

Signed at Hull, England, this thirteenth day of September, 1922.

JOHN WILSON.